(12) United States Patent
Parra

(10) Patent No.: US 11,095,696 B2
(45) Date of Patent: *Aug. 17, 2021

(54) SOCIAL NETWORKING SYSTEM AND METHOD

(71) Applicant: Tu Orbit Inc., Hillsdale, NJ (US)

(72) Inventor: Henry Parra, Hillsdale, NJ (US)

(73) Assignee: Tu Orbit Inc., Hillsdale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,906

(22) Filed: Jun. 6, 2019

(65) Prior Publication Data
US 2019/0289045 A1 Sep. 19, 2019

Related U.S. Application Data

(63) Continuation of application No. 15/683,261, filed on Aug. 22, 2017, now Pat. No. 10,362,073, which is a continuation of application No. 14/057,915, filed on Oct. 18, 2013, now Pat. No. 9,769,224.

(60) Provisional application No. 61/715,621, filed on Oct. 18, 2012.

(51) Int. Cl.
G06F 3/048 (2013.01)
H04L 29/06 (2006.01)
H04L 29/08 (2006.01)

(52) U.S. Cl.
CPC ............ H04L 65/403 (2013.01); G06F 3/048 (2013.01); H04L 67/02 (2013.01); H04L 67/18 (2013.01); H04L 67/306 (2013.01); H04L 69/28 (2013.01)

(58) Field of Classification Search
CPC ....... G06F 3/048; H04L 65/403; H04L 67/02; H04L 67/18; H04L 67/306; H04L 69/28
See application file for complete search history.

(56) References Cited

U.S. PATENT DOCUMENTS

| 8,122,341 | B1 | 2/2012 | Dayan |
| 8,510,773 | B1 | 8/2013 | Abou-Rizk et al. |
| 8,812,705 | B1 | 8/2014 | Wang |
| 8,862,995 | B1 | 10/2014 | Kuhne |
| 9,552,334 | B1 | 1/2017 | Meisels |
| 2007/0255643 | A1 | 11/2007 | Capuano |
| 2008/0098302 | A1 | 4/2008 | Roose |
| 2008/0172288 | A1 | 7/2008 | Pilskalns |
| 2009/0131025 | A1 | 5/2009 | Sharma et al. |
| 2009/0300163 | A1 | 12/2009 | Holm |
| 2011/0313856 | A1 | 12/2011 | Cohen et al. |
| 2012/0131645 | A1 | 5/2012 | Harm |

(Continued)

Primary Examiner — Xuyang Xia
(74) Attorney, Agent, or Firm — Robert E. Colletti; Haug Partners LLP

(57) ABSTRACT

A social network is provided. The social network of the present invention may prompt a user to create a "moment". The moment of the present invention may include at least a time and a location of a place that the user is currently located, was located in the past, or will be located in the future. The moment may be stored on a database. Multiple users may create accounts and create a plurality of moments. All of the moments of the users may be stored on the database. The present invention may include a search box so that third party users may search for other third party user's moments. A user may enter in search criteria and may be presented with a plurality of moments based on the inputted search criteria.

8 Claims, 3 Drawing Sheets

(56) References Cited

U.S. PATENT DOCUMENTS

| | | | |
|---|---|---|---|
| 2012/0166432 A1* | 6/2012 | Tseng | G06F 16/24578 |
| | | | 707/728 |
| 2013/0117692 A1 | 5/2013 | Padmanabhan | |
| 2013/0174275 A1 | 7/2013 | Micucci | |
| 2013/0185285 A1 | 7/2013 | Shuman | |
| 2013/0227471 A1 | 8/2013 | Cha | |
| 2013/0268594 A1 | 10/2013 | Kogut | |
| 2014/0019867 A1* | 1/2014 | Lehtiniemi | H04W 4/021 |
| | | | 715/738 |
| 2015/0193819 A1 | 7/2015 | Chang | |
| 2015/0278878 A1* | 10/2015 | Chau | G06Q 30/0276 |
| | | | 705/14.72 |

* cited by examiner

SOCIAL NETWORKING SYSTEM AND METHOD

CROSS-REFERENCE TO RELATED APPLICATIONS

This application is a continuation of U.S. application Ser. No. 15/683,261, filed Aug. 22, 2017, which is a continuation of U.S. application Ser. No. 14/057,915, filed Oct. 18, 2013, now U.S. Pat. No. 9,769,224, which claims the benefit of priority of U.S. provisional application No. 61/715,621, filed Oct. 18, 212 the contents of which are herein incorporated by reference.

BACKGROUND OF THE INVENTION

The present invention relates to a social networking system and method and, more particularly, to a social networking program that networks individuals based on time and location.

Current social networks do not protect user's identity and do not provide a hub for connecting with people based on time and location. Additionally, users are not able to connect to other social networks using one single social network. Current social networks are cluttered and are not dynamic enough to meet a user's personal needs. Further, the members of the social network cannot sort through uploaded files of other users by time, date, and location.

As can be seen, there is a need for an improved social networking site that allows people connect with others based on time and location posts.

SUMMARY OF THE INVENTION

In one aspect of the present invention, a system for social networking comprises: a computer having a user interface; and a program product comprising a machine-readable program code for causing, when executed, the computer to perform the following process steps: prompting a user to create a user account; prompting the user to input personal information; storing the personal information on a database; prompting the user to create a moment, wherein the moment comprises information comprising at least a time and a location of a place that the user is currently located, was located in the past, or will be located in the future; storing the moment on the database, wherein a plurality of moments submitted from third party users are saved; receiving an entered search criteria to request viewing at least one moment within the database; and displaying the at least one moment based on the inputted search criteria.

In another aspect of the present invention, a system for social networking comprises: a computer having a user interface; and a program product comprising a machine-readable program code for causing, when executed, the computer to perform the following process steps: prompting a user to create a user account; prompting the user to input personal information; storing the personal information on a database; uploading a time and a location of the user to the database, wherein the database comprises the time and location of third party users; searching for third party users having a similar time and location as the uploaded time and location of the user; and giving the user the ability to connect/socialize with the third party users that have a similar time and location to the user. Additionally users have the ability to create moments a place them in the public domain in the map tab for all users to view them.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention may include a Social Ecosystem that allows users to communicate in anonymity, and store and publish personal location based data. In certain embodiments, the user may create a handle and submit an avatar picture in order to connect with other network users that a user does not know. The users may invite and connect with other users that uploaded information corresponding to a same time, place, and date. In certain embodiments, the user may be able to connect to other social networks. In certain embodiments, the website may include a layout comprising digital notepads and interchangeable tabs that may allow the user to separate different aspects of their life. A network user may be able to view other network user's uploads by location, type of activity, date range, time range and a unique user.

The present invention may include a social network that may store the user's location, date, and time data. The data stored may be used to connect users to other users who shared the same or very similar location, date, and time period (to be specified by the network). The present invention may further provide users with an outlet to organize data that third party network users have uploaded in a public folder and gives third party users the ability to view the uploaded information by user, date range, time range, and location.

The present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

Figure 1:
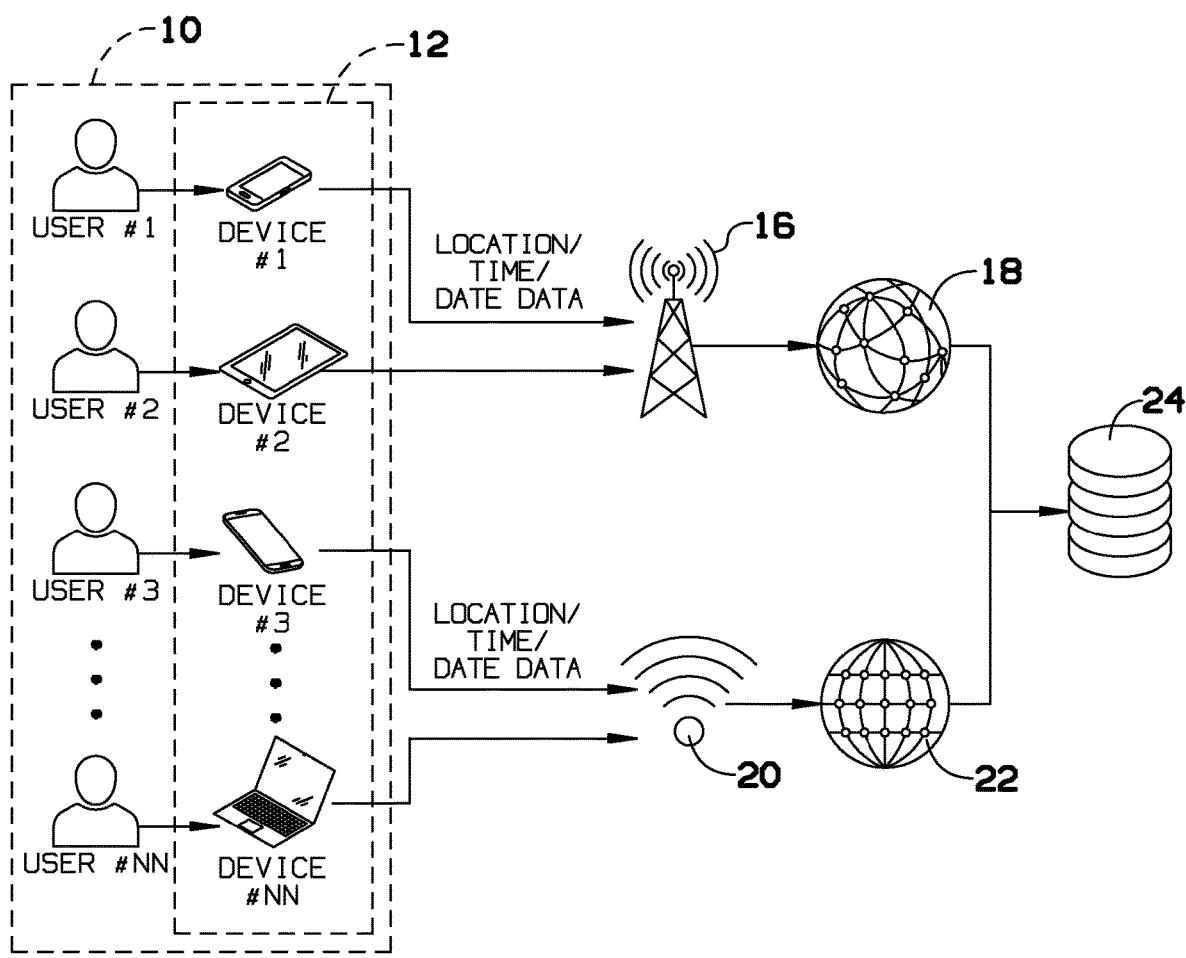
FIG. 1 is a schematic view of the present invention.
Figure 2:
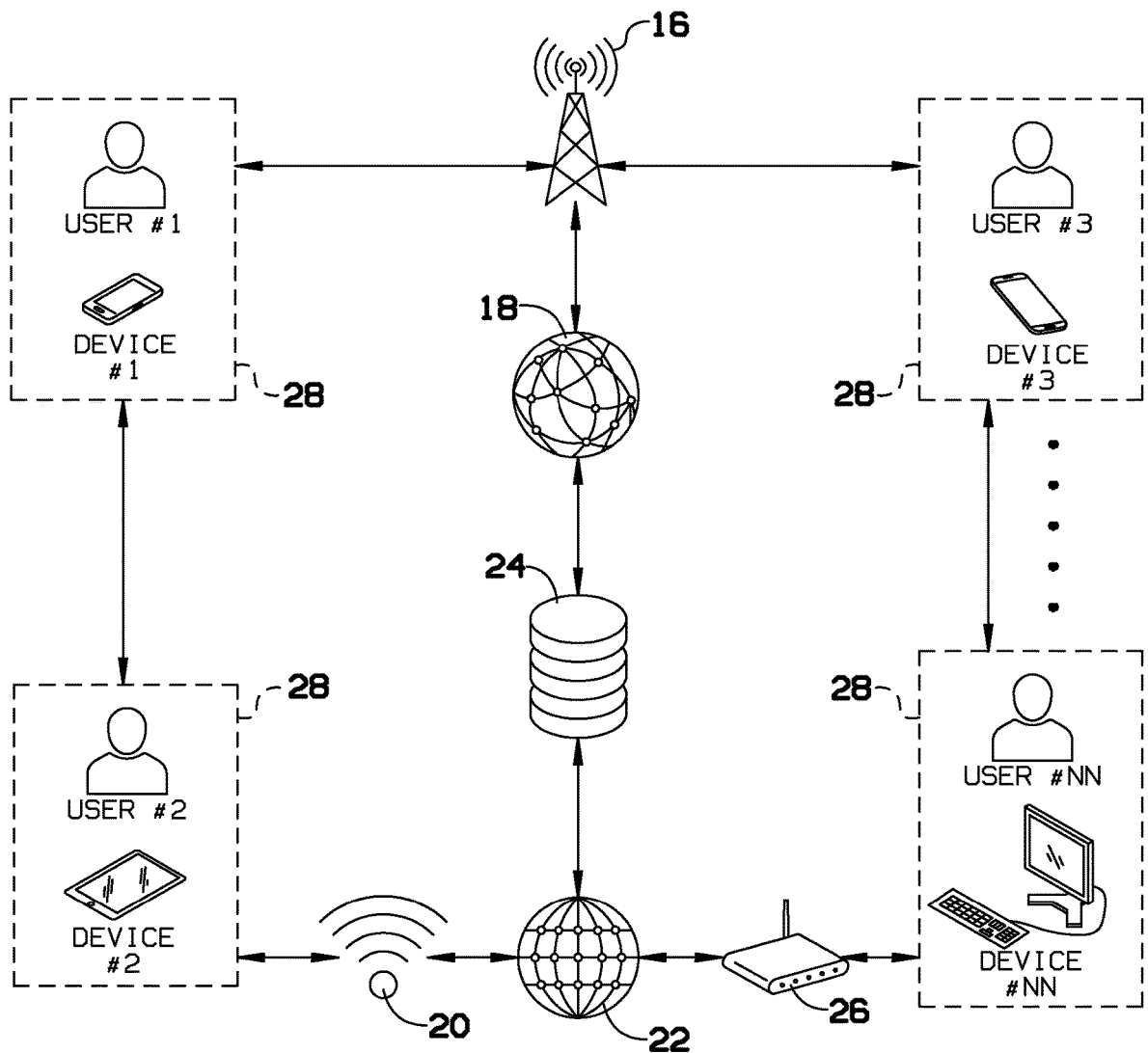
FIG. 2 is a schematic view of the present invention.
Figure 3:
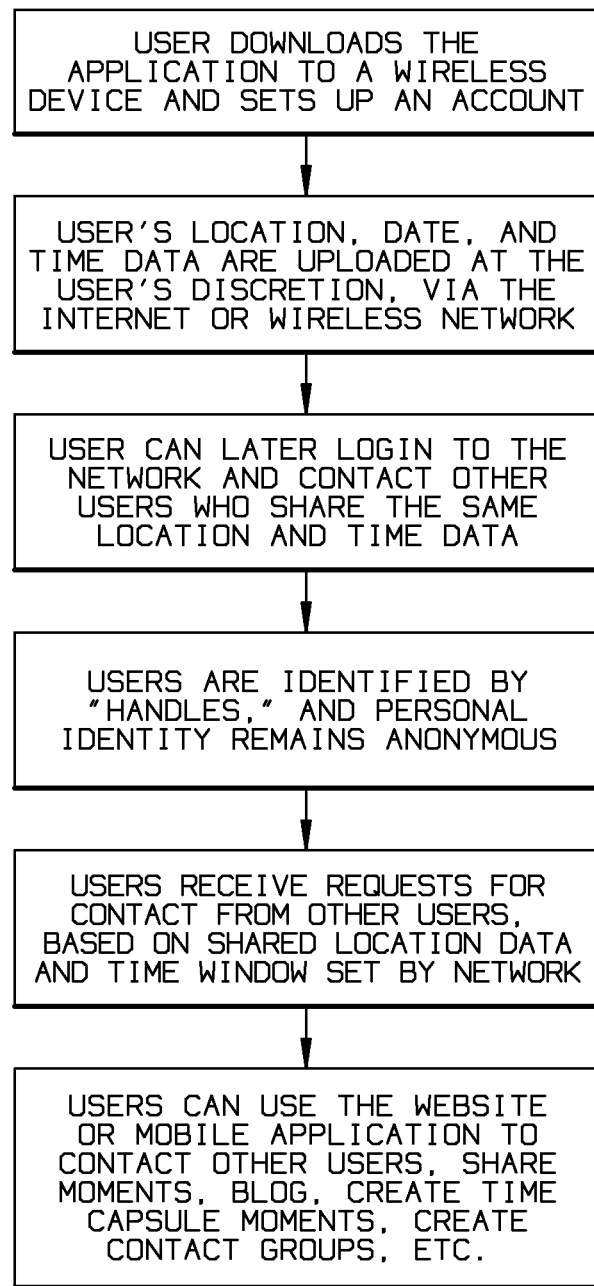
FIG. 3 is a flow chart of the present invention.

Referring to the FIGS. 1 through 3, the present invention may include a plurality of users 10 within the same location using computers 12, such as smart devices, to create an account and login. The computers 12 may either connect to a wireless network 18 via a wireless tower 16 or may connect to the internet 22 using a hard-line or a Wi-Fi hot spot 20. Both of the wireless network 18 and the internet 22 may access a database 24 in which the information uploaded from the computer 12 may be stored.

Using the computer 12 connected to the database 24, the user may create the user account on the social networking website. In certain embodiments, the user may then input information. The information may include personal information such as a name, an age, a sex, a plurality of physical traits, and a plurality of personal interests. The user may also upload a picture and/or an avatar that represents and is displayed as their profile. The account and the personal information may be stored on the database 24. The location and time data of the user may be transferred to the database 24 and shared with other users 10 within the same location. The location and time data may not be shared with other users 28 that are not within the same time frame or not within the same location.

The social network of the present invention may prompt a user to create a "moment". The moment of the present invention may include at least a time and a location of a place that the user is currently located, was located in the past, or will be located in the future. The moment may be stored on the database 24. Multiple users 10 may create accounts and create a plurality of moments. All of the moments of the users 10 may be stored on the database. In certain embodiments, the present invention may include a search box so that third party users may search for other third party user's moments. A user may enter in search criteria and may be presented with a plurality of moments based on the inputted search criteria.

As mentioned above, the moments of the present invention may include at least a time and a location that the user has inputted. In certain embodiments, users may attach data to the moments. The data may include, but is not limited to, uploaded video, pictures, and text. For example, if a user creates a moment based on a place that the user is going, the user may take pictures at the particular place and upload the picture to the moment.

The website or application of the present invention may be setup using different tabs and screens. For example, the present invention may include a home screen. The home screen may display all of the updated information that has been inputted by the user. In certain embodiments, the home screen may include a notepad that displays all of the user's personal moments previously submitted. The moments may be listed in chronological order. In certain embodiments the moments may include icons indicating if there is text, video, or pictures attached to the moment. In certain embodiments, the home screen may further include a map with icons representing moments in the notepad. Therefore, the moments may be placed on the map based on the location of the moment. The home page may also include the search box to search for third party user moments.

In certain embodiments, the home page may provide the user with an icon to create a moment, such as a time capsule. When selected, the user may enter in the month day and year, or simply select now, representing the time of creation. The use may either point on a map or enter in an address. In certain embodiments, the computer may include global positioning system capabilities, in which the computer may automatically locate the where the user is at that point. The user may also be given the option to upload data such as video, pictures or text. Once the moment has been created, a user may determine whether they would like to share the moment with the public or share the moment privately. For example, the user may pick between friends, family, acquaintances and the like. The present invention may further include a blog option. The user may select blog from a particular moment. A search may be automatically performed based on the particular moment's time and location. The present invention may then allow users to text third part user's that created moments with similar times and locations. Therefore, if a user lost an object at a sports game, the user may either create a new moment or select a moment already created that included the location and the time of the sports game. The user may then begin chatting with users that have moments that include the same sports game with the same time and location.

In certain embodiments, the present invention may further include a share tab. The share tab may provide a notepad of moments that other third part users have shared with the user. Therefore, a user may look at the shared moments to see where their friends are and what they are doing. The moments may be listed chronologically. Further, the user may select a certain day and time to see what users have done in the past or what users will be doing. The present invention may further allow users to comment of third party moments, which may be saved to the moment. In certain embodiments, the shared moments may also be displayed on a map.

In certain embodiments, the present invention may further include a public tab. The public tab may include a window that allows users to view shared public moments of third parties. The public tab may further include a map displaying the locations of third party users that have created moments. The user is able to upload data through the wireless device application to the public folder for all users to see. The public data can be sorted by user, location, date, and time ranges. Additionally, the data can be sorted by data type. A symbol/point depicting a public moment on the map coincides with a moment listed in tabular format adjacent to the map. Advertisements may be shown as pop ups on the map that are based on the user's current location. If the user is viewing a map location that is near the user's location then local/national advertisement may be displayed. Otherwise, national advertisement may be displayed alone.

The present invention may further include a tool to meet other people without disclosing the user's identity. For example, the user may identify the moment in time, date, and location (latitude and longitude or place specified by user) by time stamping the moment using the wireless device application or website. The application/website may then upload that information on to the database and tag information to the user's profile. If the user would like to connect with other users that have shared the same location, date, and similar time period, the user may log into present invention to connect to the network and input the information creating a moment that the user wants to socialize in. A search may be performed within the database to match up other users that shared the location and time period criteria and notify the users that there is an anonymous user that wants to connect with them. Such embodiments may be used for past moments, present moments, or future moments. The present invention may also notify the user of other shared moments created by third party users that include the same or similar time, date, and location.

By capturing location, date, and time period and uploading to the network along with other information (i.e. pictures, video, etc.) via an application in the user's wireless device, the user begins the process of social networking by date, time, and location. The information may be uploaded in real time or at a later time based on the user's discretion. The data may be stored in the database to be used at a future time for connecting with other users based on their past/future moments. When the user chooses to socialize with other users who share the specified location, date, and time period, the user may log onto the social network. Once logged in to the network, there may be a window where the user may input the search criteria and the application may run an algorithm that matches all three criteria with a variation in the time window that will be set by the network or set by the user and the network will connect you with the users that match the criteria. This may be done with complete discretion.

The present invention may include many features that are dependent on the data being uploaded. A user can use the share tab feature to share moments and the time capsule feature can be used to upload past or future experiences not captured by a wireless device. There may also be a button feature that allows the user to socialize with other social networks. The share tab may allow the user to view other user's moments by location, date, and time and allows you to comment on that shared moment. Comments may be disabled by the user that is sharing the moment. In the public tab, a user may view what any user has uploaded and can search by location, handle, time, and date. The public tab may be independent of other tabs. Once you choose to upload to the public tab, the moment may be automatically updated to the home tab, such as the notepad. The blog tab may be a button feature usable at the home tab and is used to manage your created or received blogs.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

The invention claimed is:

1. A system for sharing digital contents on a social networking platform, the system comprising:
   a network configured to connect a plurality of computers, the network configured to provide at least one of the plurality computers with an executable program;
   wherein at least one of the plurality computers has a user interface;
   wherein the executable program comprising machine-readable code which, after being provided to the at least one of the plurality computers and when executed, causes the at least one of the plurality computers to:
   prompt a first user on the user interface to create at least one picture or video, wherein the at least one picture or video comprises first location data, wherein the first location data is unloaded to a database and tagged to a profile of the first user;
   automatically search for additional pictures or videos that have similar location data as the at least one picture or video;
   display the additional pictures or videos on a map, wherein the map is displayed on a screen with icons representing the additional pictures or videos based on the respective location data;
   share, without disclosing the first user's proper name, activities done by the first user on a particular day by chronologically listing a plurality of digital contents of the first user on the screen displaying the map;
   receive an entered search criteria on a search box on the screen by the first user to request viewing at least one picture or video created by at least one third party user within the database;
   display the at least one picture or video of the at least one third party user on the map based on the entered search criteria;
   receive second location data associated with the at least one third party user;
   compare the second location data to a current location of the first user;
   determine whether the second location data is near the current location of the first user, wherein when the second location data is near the current location, a local advertisement is selected and displayed on the same screen displaying the map, and when the second location data is not near the current location of the first user, a national advertisement is selected and displayed on the same screen displaying the map.

2. The system of claim 1, wherein the first or second location data comprises a location of a place that the at least one picture or video was created.

3. The system of claim 1, wherein the first or second location data includes GPS or address coordinates of a current location of the creator of the at least one picture or video.

4. The system of claim 1, wherein the first or second location data includes a location or address input by the creator of the at least one picture or video.

5. A method executed by a computer for sharing digital contents on a social networking platform, the method comprising:
   prompting a first user on a user interface of the computer to create at least one picture or video, wherein the at least one picture or video comprises first location data, wherein the first location data is unloaded to a database and tagged to a profile of the first user;
   automatically searching for additional pictures or videos that have similar location data as the at least one picture or video;
   displaying the additional pictures or videos on a map, wherein the map is displayed on a screen with icons representing the additional pictures or videos based on the respective location data;

sharing, without disclosing the first user's proper name, activities done by the first user on a particular day by chronologically listing a plurality of digital contents of the first user on the screen displaying the map;

receiving an entered search criteria on a search box on the screen by the first user to request viewing at least one picture or video created by at least one third party user within the database;

displaying the at least one picture or video of the at least one third party user on the map based on the entered search criteria;

receiving second location data associated with the at least one third party user;

comparing the second location data to a current location of the first user;

determining whether the second location data is near the current location of the first user, wherein when the second location data is near the current location, a local advertisement is selected and displayed on the same screen displaying the map, and when the second location data is not near the current location of the first user, a national advertisement is selected and displayed on the same screen displaying the map.

6. The method of claim 5, wherein the first or second location data comprises a location of a place that the at least one picture or video was created.

7. The method of claim 5, wherein the first or second location data includes GPS or address coordinates of a current location of the creator of the at least one picture or video.

8. The method of claim 5, wherein the first or second location data includes a location or address input by the creator of the at least one picture or video.

* * * * *